United States Patent
Abou Mahmoud et al.

(10) Patent No.: US 10,049,310 B2
(45) Date of Patent: Aug. 14, 2018

(54) IMAGE TEXT ANALYSIS FOR IDENTIFYING HIDDEN TEXT

(71) Applicant: International Business Machines Corporation, Armonk, NY (US)

(72) Inventors: Alaa Abou Mahmoud, Dracut, MA (US); Paul R. Bastide, Boxford, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 25 days.

(21) Appl. No.: 15/251,698

(22) Filed: Aug. 30, 2016

(65) Prior Publication Data
US 2018/0060705 A1    Mar. 1, 2018

(51) Int. Cl.
*G06K 9/34*    (2006.01)
*G06K 9/68*    (2006.01)
*G06F 17/28*    (2006.01)

(52) U.S. Cl.
CPC ......... *G06K 9/6878* (2013.01); *G06F 17/289* (2013.01); *G06K 9/344* (2013.01); *G06K 2209/01* (2013.01); *G06K 2209/09* (2013.01)

(58) Field of Classification Search
CPC .. G06K 2209/01; G06K 9/72; G06K 9/00469; G06K 9/4604; G06K 9/00483; G06K 9/03; G06K 9/325; G06K 9/344
See application file for complete search history.

(56) References Cited

U.S. PATENT DOCUMENTS

| | | | | |
|---|---|---|---|---|
| 8,036,895 | B2 * | 10/2011 | Kurzweil | G06K 9/033 382/321 |
| 8,406,531 | B2 * | 3/2013 | Ramanujapuram | G06F 17/30247 382/201 |
| 8,977,639 | B2 | 3/2015 | Petrou et al. | |
| 9,087,046 | B2 | 7/2015 | Solntseva | |
| 9,135,242 | B1 | 9/2015 | Wang et al. | |
| 9,286,683 | B1 | 3/2016 | Ramos | |
| 9,323,784 | B2 | 4/2016 | King et al. | |
| 2008/0144935 | A1 | 6/2008 | Chav et al. | |
| 2013/0325600 | A1 | 12/2013 | Everingham et al. | |

(Continued)

OTHER PUBLICATIONS

Chen et al.; "Efficient automatic OCR word validation using word partial format derivation and language model"; Proceeding SPIE vol. 7534: document recognition and retrieval XVII, Jan. 2010.*

(Continued)

*Primary Examiner* — Eueng-Nan Yeh
(74) *Attorney, Agent, or Firm* — Janaki K. Davda; Konrad, Raynes, Davda & Victor LLP

(57) ABSTRACT

Provided are techniques for image text analysis for identifying hidden text. An Optical Character Reader (OCR) is utilized to extract a text string from an image. Context within the image is analyzed. It is determined that the extracted text string is a partial text string based on the context. For a first radius level of a plurality of radius levels, a segmented sub-image is identified around the partial text string within the first radius level, an image search on the segmented sub-image is performed to identify a candidate text string, and, in response to determining that the candidate text string is a complete text string, the complete text string is provided for performing an action.

18 Claims, 10 Drawing Sheets

(56) References Cited

U.S. PATENT DOCUMENTS

2014/0111542 A1 4/2014 Wan
2015/0319510 A1 11/2015 Ould Dellahy, VIII et al.

OTHER PUBLICATIONS

Mell, P. and T. Grance, "The NIST Definition of Cloud Computing (Draft)", Sep. 2011, Computer Security Division Information Technology Laboratory National Institute of Standards and Technology, Total 7 pp.

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Minetto, R., N. Thome, M. Cord, J. Stolfi, F. Precioso, J. Guyomard, and N.J. Leite, "Text Detection and Recognition in Urban Scenes", 2011 IEEE Int. Conf. on Computer Vision Workshops (ICCV Workshops), IEEE, 2011, Total 8 pp, (published before this application Aug. 2016).

"Optical Character Recognition", Wikipedia, last modified on Aug. 23, 2016, Total 6 pp.

Qi, W., L. Gu, H. Jiang, X. Chen, and H. Zhang, "Integrating Visual, Audio and Text Analysis for News Video", Proc. 2000 Int. Conf. in Image Processing, v.3 (2000), pp. 520-523, IEEE, 2000, Total 4 pp, (published before this application Aug. 2016).

Wikipedia, "Coherence (linguistics)", [online], [Retrieved on Aug. 22, 2016]. Retrieved from the Internet at <URL: https://en.wikipedia.org/wiki/Coherence>, Last modified on Sep. 6, 2015, Total 2 pp.

Wikipedia, "Optical Character Recognition", [online], [Retrieved on Aug. 23, 2016]. Retrieved from the Internet at <URL: https://en.wikipedia.org/wiki/Optical_character_recognition, Last modified on Aug. 23, 2016, Total 9 pp.

\* cited by examiner

IMAGE TEXT ANALYSIS FOR IDENTIFYING HIDDEN TEXT

FIELD

Embodiments of the invention relate to image text analysis for identifying hidden text. In particular, embodiments of the invention relate to image text analysis for identifying the hidden text for use in summarizing an image and translating the text for image globalization enhancement.

BACKGROUND

Images contain a wealth of information. When images are captured with, for instance, a text string in the image being covered by a person standing in front of the image or covered by some other objects/images within the image, then, there is arises a difficulty in summarizing a text string within the image or translating an embedded text string into a different language (e.g., English to Chinese). As a result, the translations are not accurate.

SUMMARY

Provided is a method for image text analysis for identifying hidden text. The method comprises: utilizing, using a processor of a computer, an Optical Character Reader (OCR) to extract a text string from an image; analyzing context within the image; determining that the extracted text string is a partial text string based on the context; and, for a first radius level of a plurality of radius levels, identifying a segmented sub-image around the partial text string within the first radius level, performing an image search on the segmented sub-image to identify a candidate text string, and, in response to determining that the candidate text string is a complete text string, providing the complete text string for performing an action.

Provided is a computer program product for image text analysis for identifying hidden text. The computer program product comprising a computer readable storage medium having program code embodied therewith, the program code executable by at least one processor to perform: utilizing an Optical Character Reader (OCR) to extract a text string from an image; analyzing context within the image; determining that the extracted text string is a partial text string based on the context; and, for a first radius level of a plurality of radius levels, identifying a segmented sub-image around the partial text string within the first radius level, performing an image search on the segmented sub-image to identify a candidate text string, and, in response to determining that the candidate text string is a complete text string, providing the complete text string for performing an action.

Provided is a computer system for image text analysis for identifying hidden text. The computer system comprises one or more processors, one or more computer-readable memories and one or more computer-readable, tangible storage devices and program instructions, stored on at least one of the one or more computer-readable, tangible storage devices for execution by at least one of the one or more processors via at least one of the one or more memories, to perform operations comprising: utilizing an Optical Character Reader (OCR) to extract a text string from an image; analyzing context within the image; determining that the extracted text string is a partial text string based on the context; and, for a first radius level of a plurality of radius levels, identifying a segmented sub-image around the partial text string within the first radius level, performing an image search on the segmented sub-image to identify a candidate text string, and, in response to determining that the candidate text string is a complete text string, providing the complete text string for performing an action.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments retrieve a complete text string that is partially covered in an image for at least one of summarizing that image and translating the text string into another language.

Figure 1:
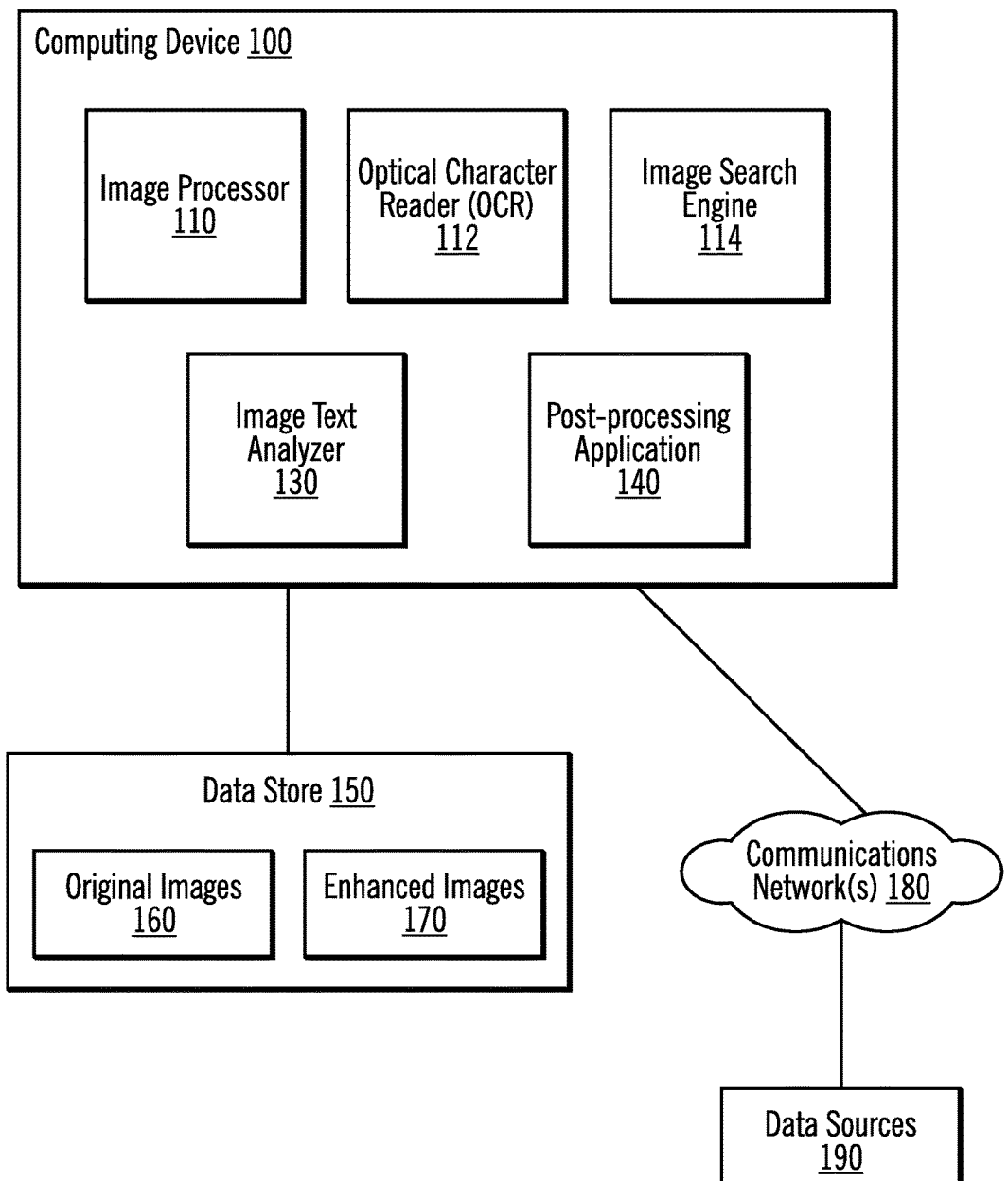
FIG. 1 illustrates, in a block diagram, a computing environment in accordance with certain embodiments.

FIG. 1 illustrates, in a block diagram, a computing environment in accordance with certain embodiments. A computing device 100 is coupled to a data store 150 and to one or more communications networks 180. The computing device 100 includes an image processor 110, an Optical Character Reader (OCR) 112, an image search engine 114, an image text analyzer 130, and a post-processing application 140.

The data store 150 includes original images 160 and enhanced images 170. An original image 160 may have a text string covered (and incomplete), but the corresponding enhanced image 170 is generated by the image text analyzer 130 to provide the complete text string. The original images may be from a scanned document, a photo, a billboard, etc. The complete text string may also be referred to as a full text string or an entire text string.

The one or more communications networks may be connections to the internet, an intranet, etc. The one or more communications networks 180 are connected to data sources 190. The data sources 190 may be relational data bases, document stores, file systems, etc.

The image processor 110 performs various types of image processing, such as fixing the color of the image. Embodiments utilize the OCR 112 to convert a text string extracted from an original image 160 to a text string that is in a format for analysis. With embodiments, the OCR 112 is used to convert the text sting in the original images 260 into machine-encoded text string. The image search engine 114 is used to search for images in the data sources 190.

The image text analyzer 130 analyzes the text string and determines whether the text string makes sense in the context of other objects in the image. If the text string does not make sense in the context, then the image text analyzer 130 determines whether the text string is partially covered by one or more other objects in the image. In particular, the determination is made by the image text analyzer 130 segmenting the objects around the text string from the whole image, radius by radius. The image text analyzer 130 utilizes the image search engine 114 to search for additional information for the segmented image within a first radius level in order to determine the complete text string. If the returned results are not satisfactory, then the image text analyzer 130 may further segment the objects that are in the next radius level until a satisfactory result is identified. With embodiments, the radius levels are for "rings" or "circles" around the text, however, with other embodiments, shapes other than "circles" may be used. With embodiments, the user may configure a number of radius levels to be used and may configure a size increment for each radius level (e.g., a number of pixels between each pair of radius levels or a percentage if the original image size, such as 30%). With embodiments, the radius levels may be equidistant, such as 50 pixels between each pair of radius levels, or may be different, such as 50 pixels between the first pair of radius levels, 100 pixels between the second pair of radius levels, etc.

In particular, the image text analyzer 130 utilizes the OCR 112 to convert the text string identified from the newly returned images based on the segmentation. The image text analyzer 130 determines whether the new text string makes sense in the context. If so, the image text analyzer 130 may use this information to summarize the image or use machine translation techniques to translate the new text string into a desired language for globalization purposes.

Figure 2:
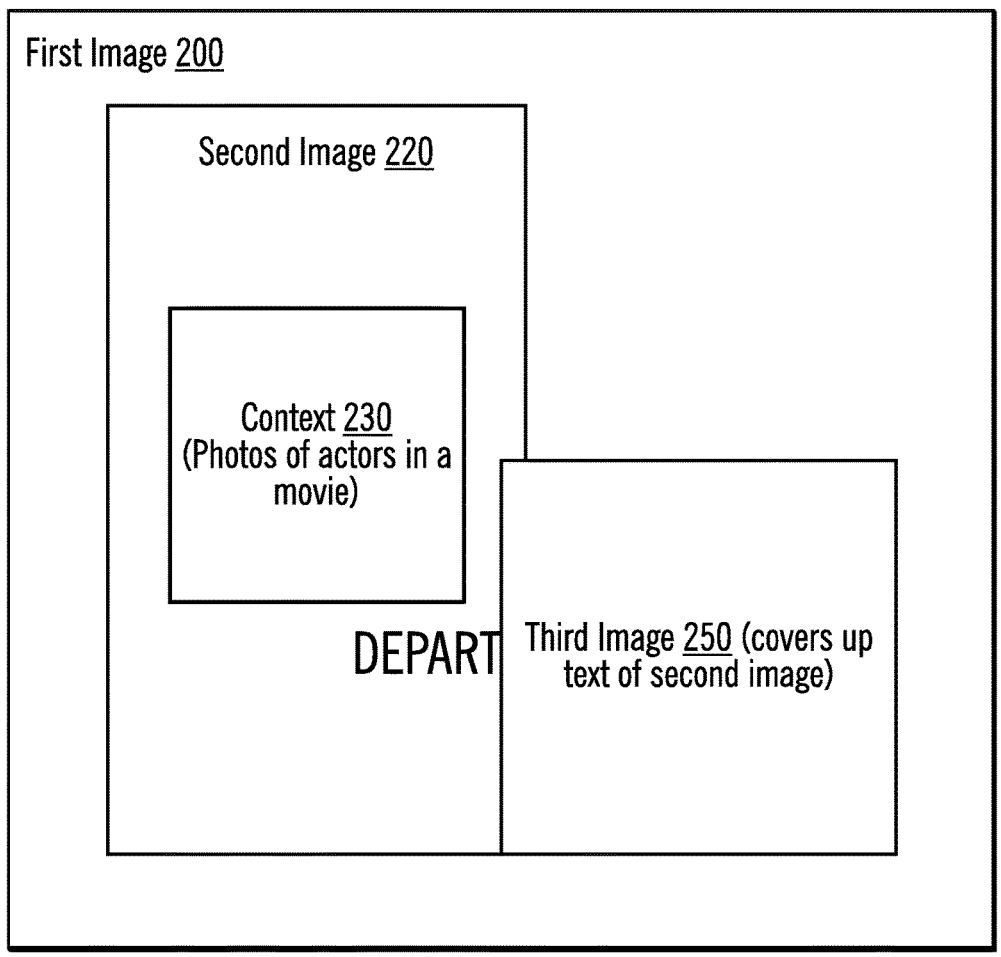
FIG. 2 illustrates a covered text string in a billboard in accordance with certain embodiments.

FIG. 2 illustrates a covered text string in a billboard in accordance with certain embodiments. A first image 200 includes a second image 220 (which is a building for this example) with context 230 (which for this example includes photos of actors in a movie) and text "DEPART". The first image 200 also includes a third image 250 (which is a photo taken near the building for this example). The third image 250 partially covers the text string beginning with "DEPART" in the first image 200. When the OCR 112 is used to extract the text string from the first image 200, for summarizing that image or translating the text string, only the text string "DEPART" is extracted, but this text string does not make sense in the context 230. Thus, the incomplete text string may lead to an incorrect summary of the image or an incorrect translation of the text string. For example, the complete text string may be: "DEPARTMENT", "DEPARTURE", "DEPARTED", etc. For this example, the complete text string is "DEPARTED". Thus, the third image 250 covers "ED" (the last letters of "DEPARTED").

Figure 3A:
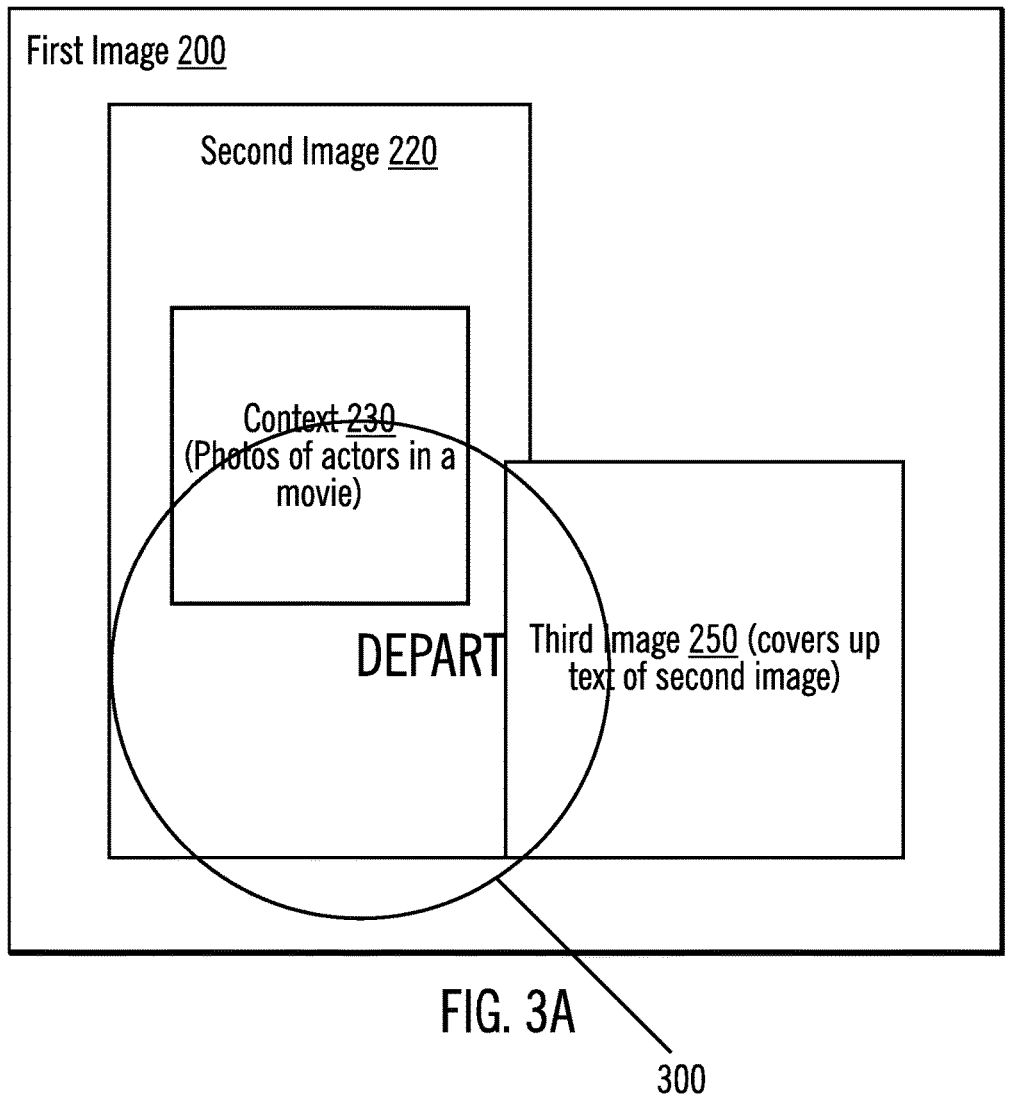
FIG. 3A illustrates a segmented sub-image in a billboard accordance with certain embodiments.

FIG. 3A illustrates a segmented sub-image in a billboard accordance with certain embodiments. In FIG. 3A, the text string "DEPART" is a center of a circle 300 that is drawn to a first radius level.

Figure 3B:
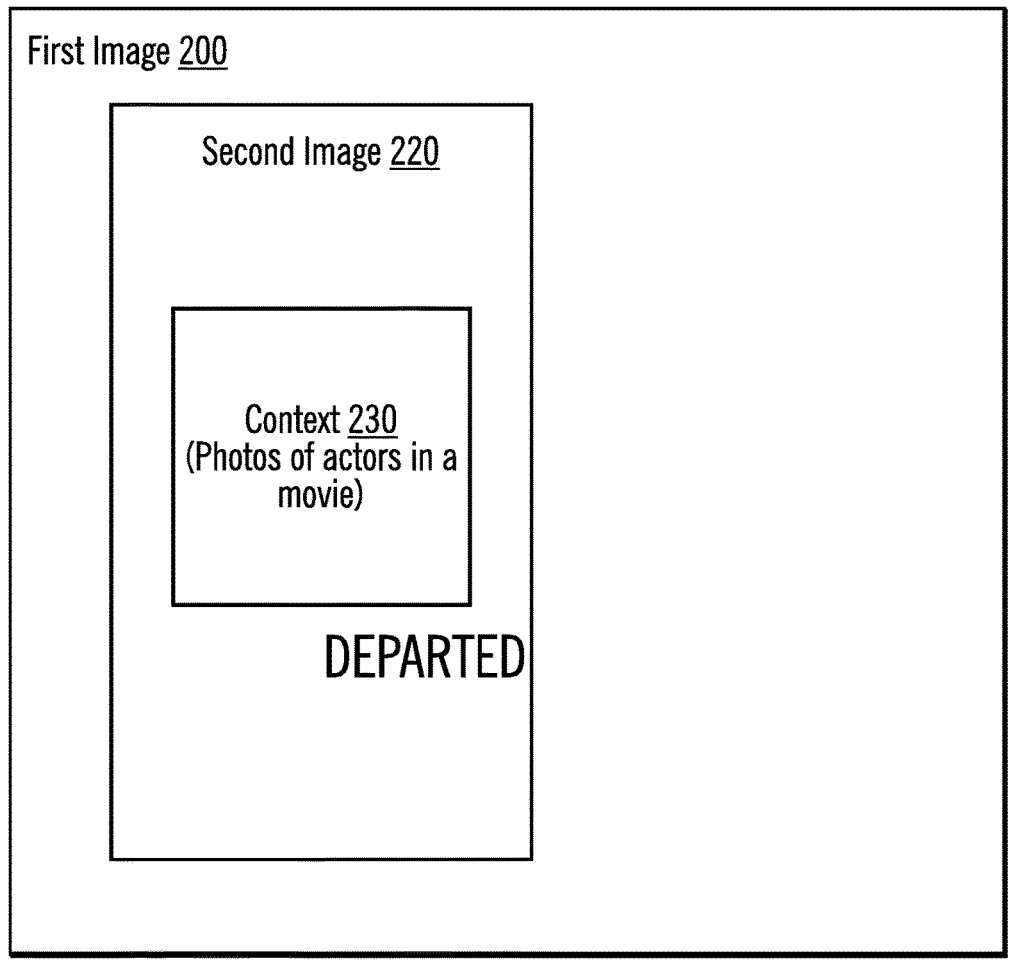
FIG. 3B illustrates an uncovered text string in a billboard accordance with certain embodiments.

FIG. 3B illustrates an uncovered text string in accordance with certain embodiments. In FIG. 3B, the first image 200 is illustrated with the complete text string "DEPARTED", which was identified using the context 230.

Figure 4A:
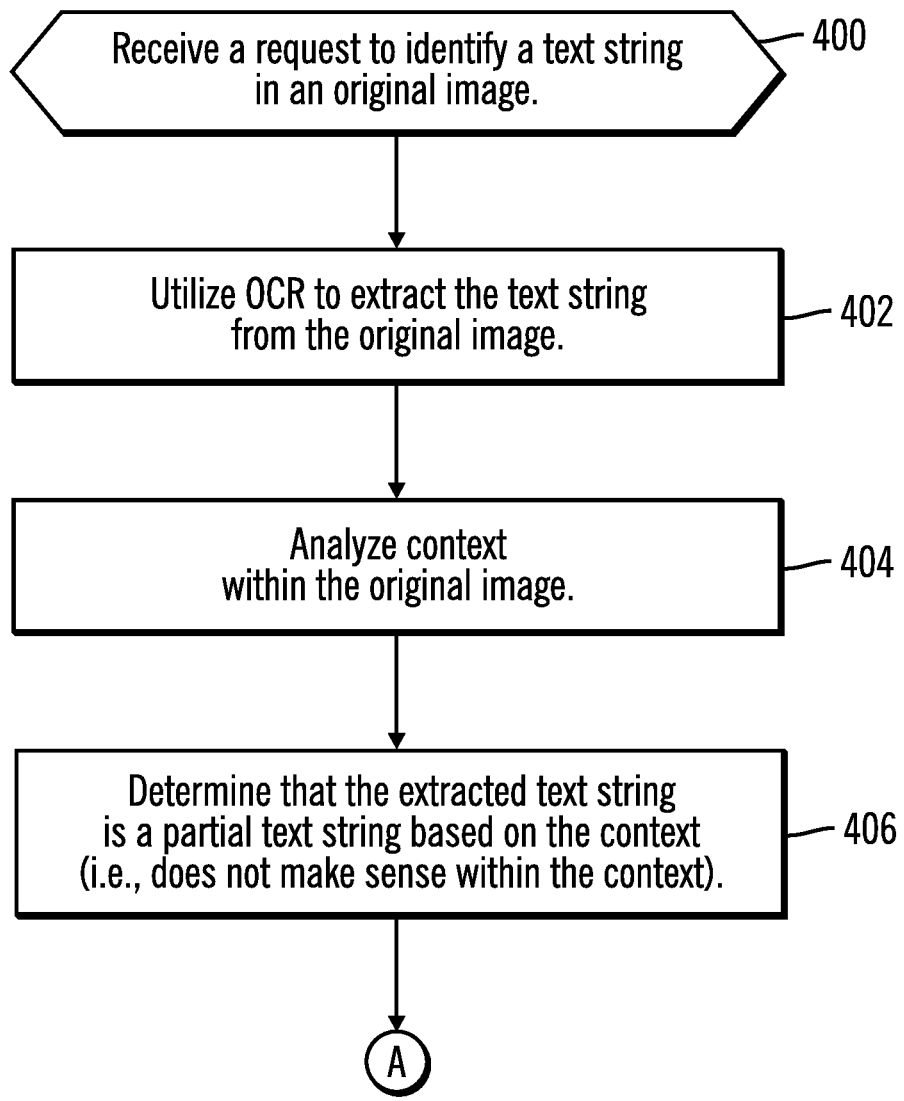
FIGS. 4A and 4B illustrates, in a flow chart, operations for identifying hidden text in accordance with certain embodiments.
Figure 4B:
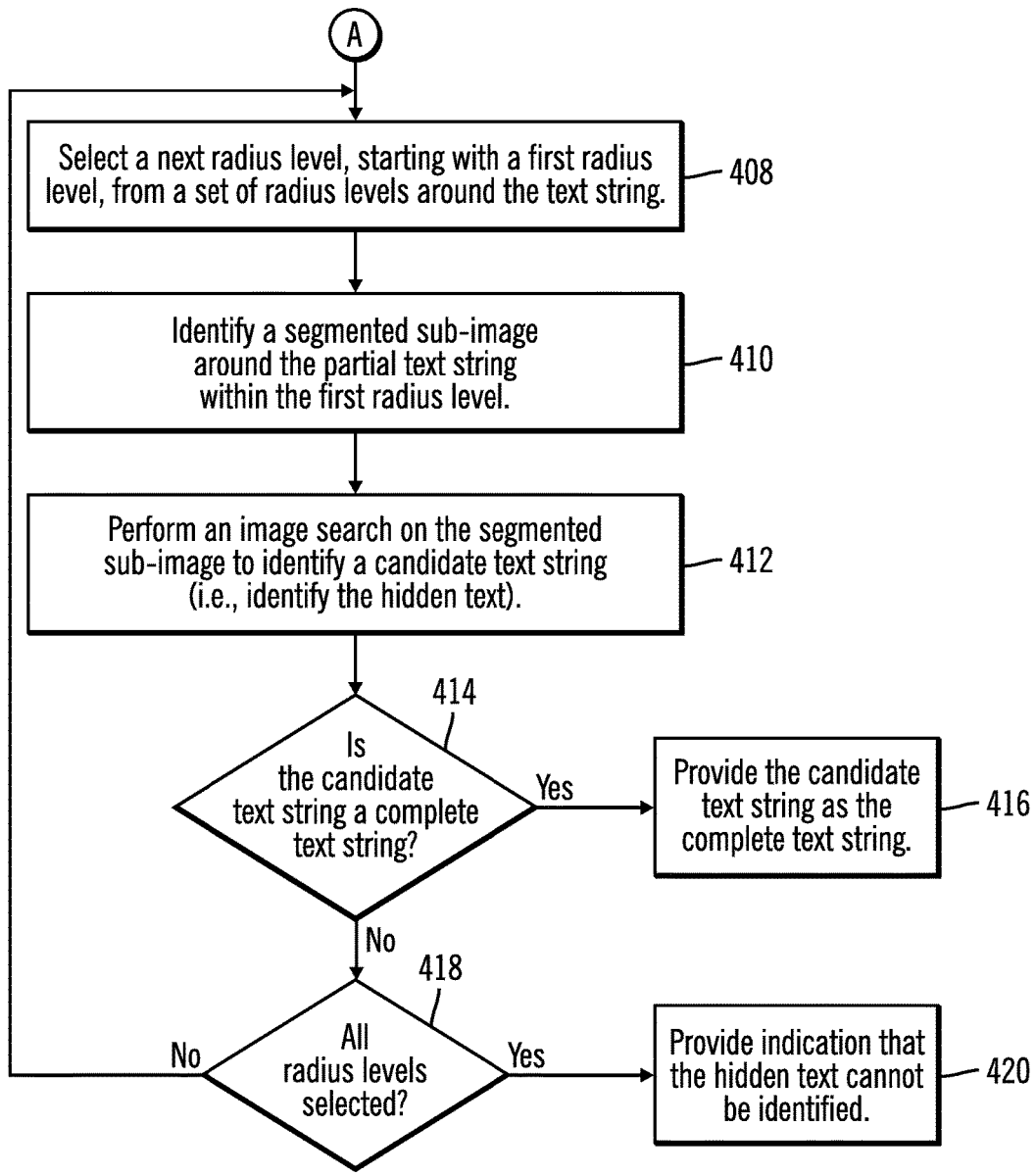

FIGS. 4A and 4B illustrates, in a flow chart, operations for identifying hidden text in accordance with certain embodiments. Control begins at block 400 with the image text analyzer 130 receiving a request to identify a text string in an original image. If there are multiple text strings in the image, then the operations of FIGS. 4A and 4B may be performed for each of the text strings in the image.

In block 402, the image text analyzer 130 utilizes the OCR 112 to extract a text string from the original image. With reference to image 200, the OCR 112 extracts "DEPART", but part of the text string is covered by the third image 250.

In block 404, the image text analyzer 130 analyzes context within the original image. Such identification of context may include summarizing the context. With embodiments, the image text analyzer 130 separates the graphics (a form of sub-images) and text components of the image. The image text analyzer 130 scans through these graphics and further separates the objects within the graphics by identifying the main outline of the objects. These objects within the graphics are used for analyzing the context of the original image. Then, the image text analyzer 130 is able to conduct image searches by searching the individual objects identified in the original image through the image search engine. With reference to image 200, the context is determined to be photos of actors in a movie.

In block 406, the image text analyzer 130 determines that the extracted text string is a partial text string (i.e., does not make sense within the context). A partial text string may also be referred to as an incomplete text string. With embodiments, this may be done with text coherence to detect whether the extracted text string is a partial text string or not. Text coherence may be described as using syntactical features (e.g., use of deictic, anaphoric and cataphoric elements, or a logical tense structure), presuppositions about text, and real world knowledge about text to determine whether the extracted text makes sense within the context. In particular, the image text analyzer 130 integrates the text string "DEPART" into the context to see whether it makes sense. In this example, the image text analyzer 130 recognizes that the text string "DEPART" does not make sense in this context of the photos of the actors in a movie.

From block 406 (FIG. 4A), processing continues to block 408 (FIG. 4B). In block 408, the image text analyzer 130 selects a next radius level, starting with a first radius level, from a set of radius levels around the text string.

In block 410, the image text analyzer 130 identifies a segmented sub-image around the partial text string within the first radius level. That is, embodiments take one piece (segmented sub-image) of the original image, and this segmented-sub-image is identified by using the original text string as the center and using the pre-defined radius level to form a circle around the partial text string. Then, the portion of the image within the circle is the segmented sub-image. With embodiments, that area within the first radius level is a segment for use in searching for another image that is similar. With reference to image 200, the segmented sub-images include photos of three actors in the movie. With embodiments, the text analyzer 130 starts the image segmentation by identifying a center of the text string within the original image. The text analyzer 130 uses pre-defined radius levels to expand to a first radius level. The text analyzer 130 selects the area from the center to the edge of the first radius level. Then, text analyzer 130 uses that area as the first level of the image segmentation for further image search and analysis (e.g., as described in blocks 412-414).

In block 412, the image text analyzer 130 utilizes the image processor 250 to perform an image search on the segmented sub-image to identify a candidate text string (i.e., to try to determine the complete text by identifying the hidden text). In particular, the image text analyzer 130 searches data sources 190 for an image or other information that includes the identified context and the text string. If multiple candidate text strings are found, each of the multiple candidate text strings is ranked based on various factors, such as by using text coherence. Then, the candidate text string with the highest rank is selected as the candidate text string for further processing. For the example of FIG. 2, the image text analyzer 130 searches data sources 190 for an image or other information that includes the identified context (e.g., photos of actors in a movie) and the text string ("DEPART"). In this manner, the image text analyzer 130 determines that "DEPART" is "DEPARTED".

In certain embodiments, the data sources 190 may hold different types of images (e.g., one data source stores images from movies, another data source holds images from advertisements, etc.), and the text analyzer 130 selects a data source based on the type of image being searched for and performs an image search using that data source. In certain embodiments, the original images have metadata that is used to select one or more data sources for search (e.g., if an original image is from a movie, the movie data sources are selected).

In block 414, the image text analyzer 130 determines whether the candidate text string is a complete text string (i.e., determines whether the candidate text string makes sense within the context). If so, processing continues to block 416, otherwise, processing continues to block 418. With reference to image 200, the image text analyzer 130 confirms that the text string "DEPARTED" is the complete text string in the image based on the image and/or information found with the identified context and the text string.

In block 416, the image text analyzer 130 provides the candidate text string as the complete text string. This may include displaying the complete text string, storing the complete text string in a file for further processing (e.g., summarizing the image or translating the text string). This may also include displaying the image with the complete text string shown. In certain embodiments, the complete text string is shown with the image that had covered the text string either removed or moved over.

In block 418, the image text analyzer 130 determines whether all radius levels have been selected. If so, processing continues to block 420, otherwise, processing loops back to block 408 to select a next radius level. In block 420, the image text analyzer 130 provides an indication that the hidden text cannot be identified.

With embodiments, the image text analyzer 130 conducts an image search on the segmented sub-images by expanding the radius further and further until a satisfactory result is returned or a determination is made that the hidden text cannot be identified.

Figure 5:
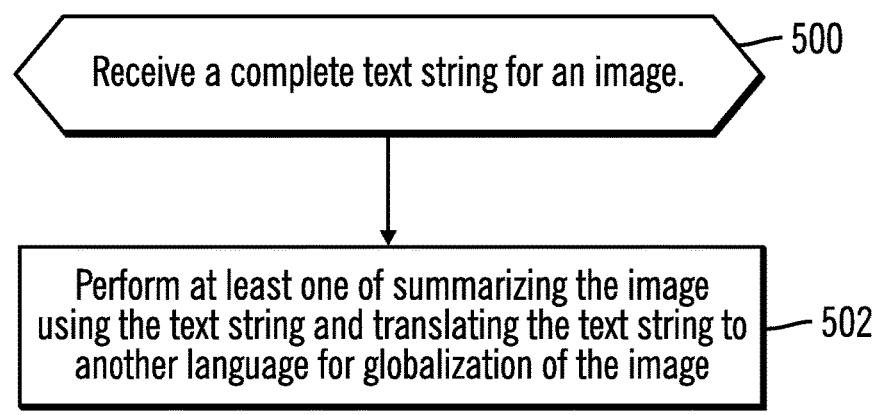
FIG. 5 illustrates, in a flow chart, operations for processing complete text string in accordance with certain embodiments.

FIG. 5 illustrates, in a flow chart, operations for processing complete text string in accordance with certain embodiments. Control begins at block 500 with a post-processing application 140 receiving a complete text string for an image from the image text analyzer 130. In block 502, the post-processing application 140 performs at least one of summarizing the image using the text string and translating the text string to another language for globalization of the image.

Thus, embodiments may be applied to summarizing an image. Also, embodiments improve automated image globalization by translating the text string in an image to another language. Embodiments identify incomplete text of a text string within the image and search for additional information in order to complete that text string.

Embodiments analyze an image for one or more contextual sub-images S (S1, S2, . . . , Sk); analyze the image utilizing OCR for one or more text elements T (T1. T2, . . . , Tn), wherein a text Tj is associated with one or more sub-images Sk, Sk+1 based on a proximity of the Tj to the sub-image Sk; analyze the one or more text elements T according to a missing information criteria to form a missing information assessment, wherein the assessment Aj is for the text element Tj; and, responsive to determining the missing information assessment Aj exceeds a contextual action criteria, perform an action associated with the contextual action criteria.

With embodiments, the sub-images Sk, Sk+1 are identified using a circular radius expansion around the text Tj with missing information. With embodiments, the missing information criteria is identifying the text Tj is a partial or covered text, and the action is an expansion of the text Tj based on a search which finds the expansion on a search results matching of the one or more sub-images Sk. With embodiments, the missing information criteria is an output language and the action is a translation of the Tj to the output language.

Embodiments further perform deriving a contextual description by applying analytic analysis to content retrieved by searching information sources for the one or more sub-images Sk according to a similarity assessment of the text Tj. With embodiments, the missing information criteria is the contextual description and the action is a summarization of the contextual description.

Figure 6:
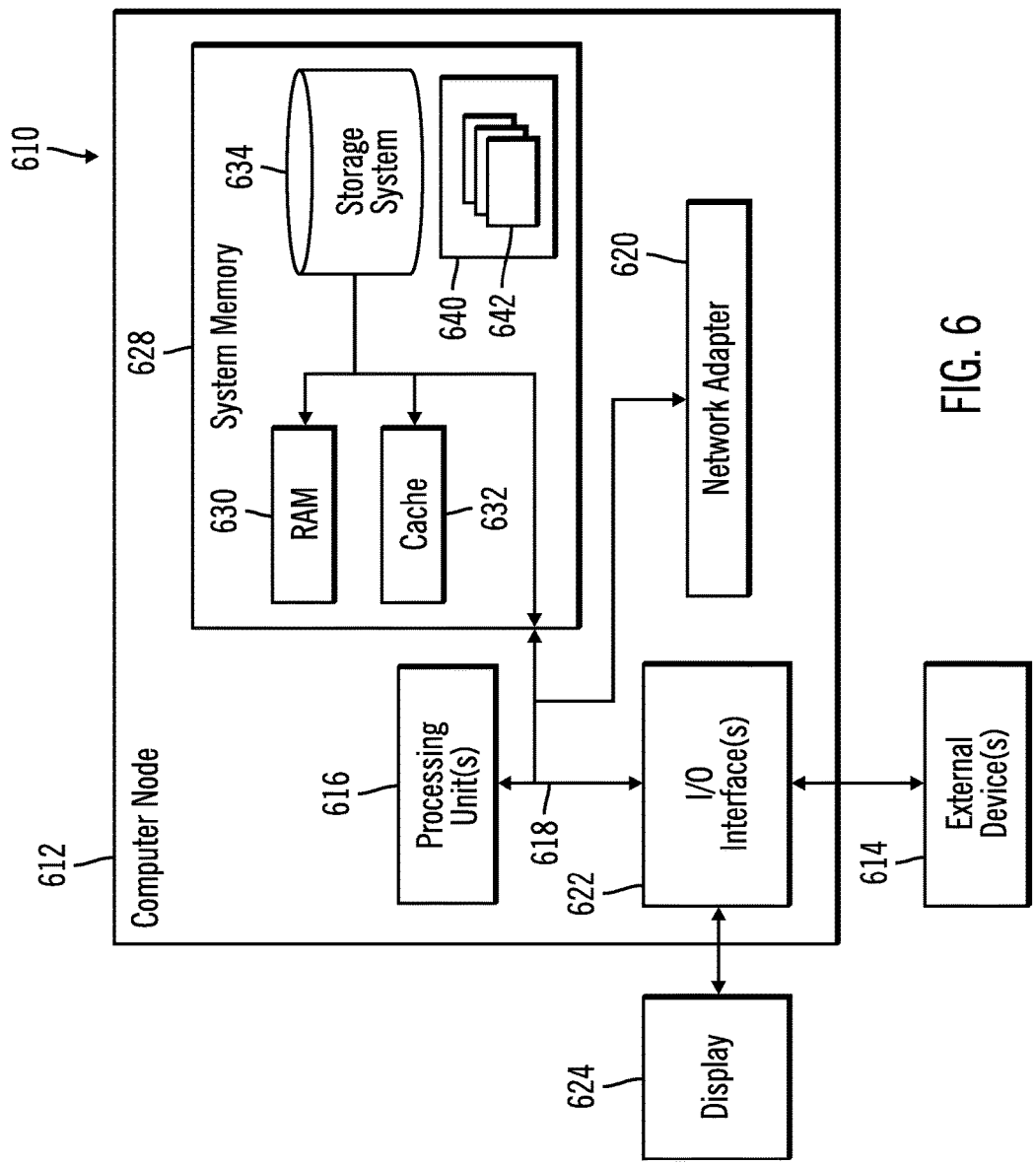
FIG. 6 illustrates a computing node in accordance with certain embodiments.

FIG. 6 illustrates a computing environment 610 in accordance with certain embodiments. In certain embodiments, the computing environment is a cloud computing environment. Referring to FIG. 6, computer node 612 is only one example of a suitable computing node and is not intended to suggest any limitation as to the scope of use or functionality of embodiments of the invention described herein. Regardless, computer node 612 is capable of being implemented and/or performing any of the functionality set forth hereinabove.

The computer node 612 may be a computer system, which is operational with numerous other general purpose or special purpose computing system environments or configurations. Examples of well-known computing systems, environments, and/or configurations that may be suitable for use with computer node 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 612 may be described in the general context of computer system executable instructions, such as program modules, being executed by a computer system. Generally, program modules may include routines, programs, objects, components, logic, data structures, and so on that perform particular tasks or implement particular abstract data types. Computer node 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer node 612 in cloud computing node 610 is shown in the form of a general-purpose computing device. The components of computer node 612 may include, but are not limited to, one or more processors or processing units 616, a system memory 628, and a bus 618 that couples various system components including system memory 628 to one or more processors or processing units 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 612 typically includes a variety of computer system readable media. Such media may be any available media that is accessible by computer node 612, and it includes both volatile and non-volatile media, removable and non-removable media.

System memory 628 can include computer system readable media in the form of volatile memory, such as random access memory (RAM) 630 and/or cache memory 632. Computer node 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, system memory 628 may include at least one program product having a set (e.g., at least one) of program modules that are configured to carry out the functions of embodiments of the invention.

Program/utility 640, having a set (at least one) of program modules 642, may be stored in system memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer node 612 may also communicate with one or more external devices 614 such as a keyboard, a pointing device, a display 624, etc.; one or more devices that enable a user to interact with computer node 612; and/or any devices (e.g., network card, modem, etc.) that enable computer node 612 to communicate with one or more other computing devices. Such communication can occur via Input/Output (I/O) interfaces 622. Still yet, computer node 612 can communicate with one or more networks such as a local area network (LAN), a general wide area network (WAN), and/or a public network (e.g., the Internet) via network adapter 620. As depicted, network adapter 620 communicates with the other components of computer node 612 via bus 618. It should be understood that although not shown, other hardware and/or software components could be used in conjunction with computer node 612. Examples, include, but are not limited to: microcode, device drivers, redundant processing units, external disk drive arrays, RAID systems, tape drives, and data archival storage systems, etc.

In certain embodiments, the computing device 100 has the architecture of computer node 612. In certain embodiments, the computing device 100 is part of a cloud environment. In certain alternative embodiments, the computing device 100 is not part of a cloud environment.

Cloud Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
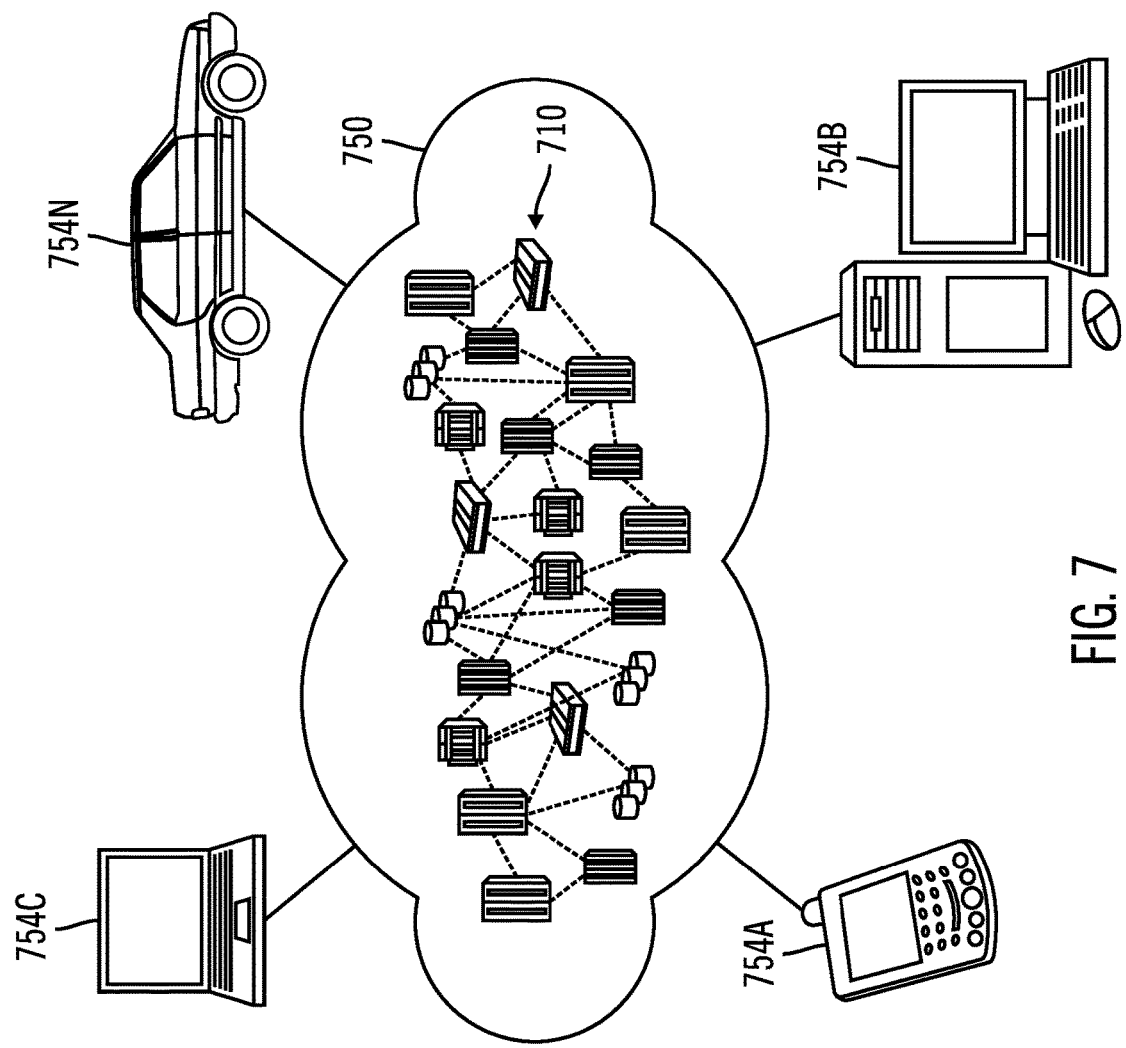
FIG. 7 illustrates a cloud computing environment in accordance with certain embodiments.

Referring now to FIG. 7, illustrative cloud computing environment 750 is depicted. As shown, cloud computing environment 750 comprises one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
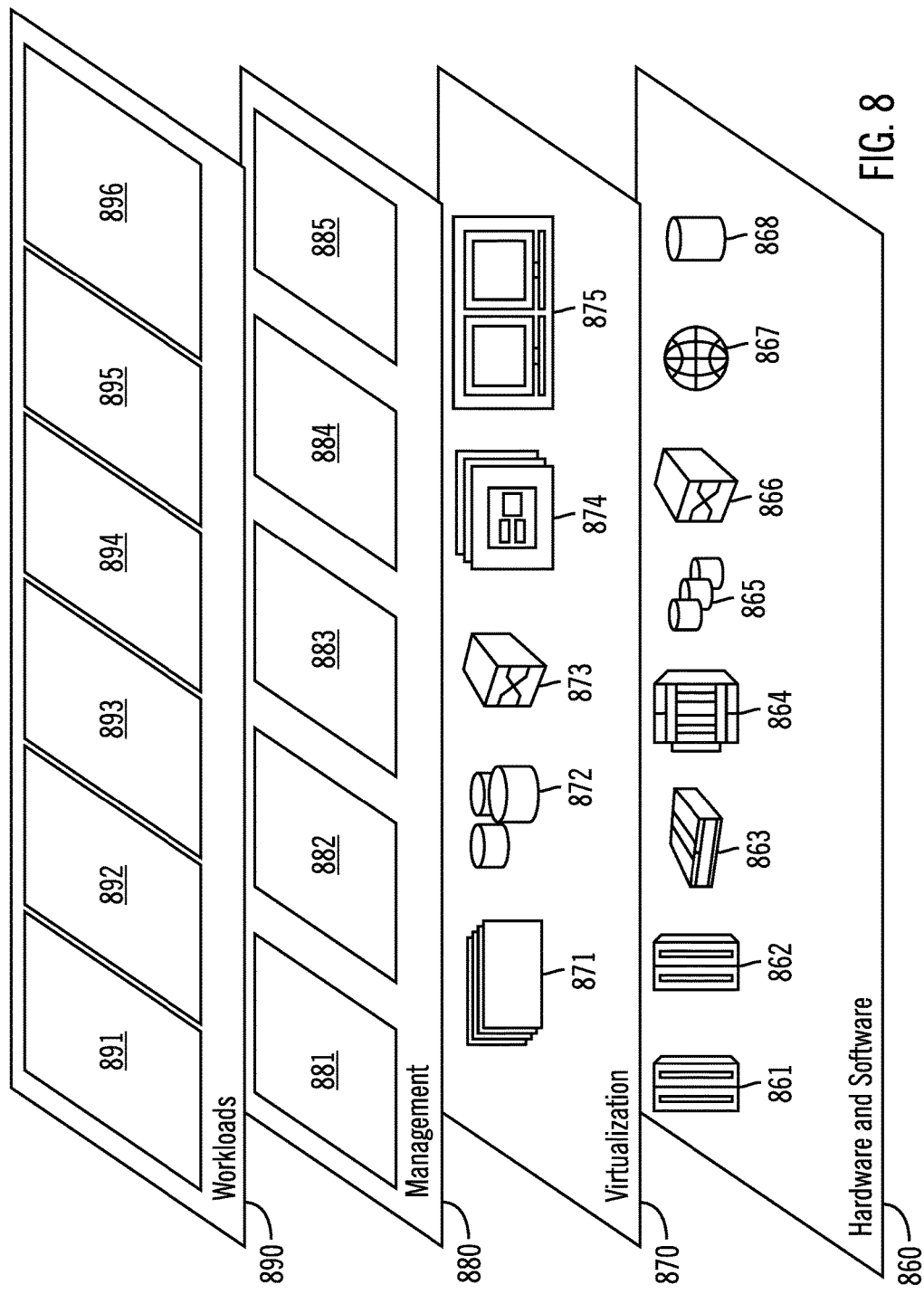
FIG. 8 illustrates abstraction model layers in accordance with certain embodiments.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and identifying hidden text 896.

Thus, in certain embodiments, software or a program, implementing identifying hidden text in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for identifying hidden text, comprising:
   utilizing, using a processor of a computer, an Optical Character Reader (OCR) to extract a text string from an image;
   analyzing context within the image;
   determining that the extracted text string is a partial text string based on the context using text coherence; and
   for a first radius level of a plurality of radius levels around the partial text string, identifying a segmented sub-image around the partial text string within the first radius level;
performing an image search on the segmented sub-image to identify a candidate text string by:
searching one or more data sources for an image that includes the partial text string and the context; and
identifying a longer text string that includes the partial text string as the candidate text string;
determining whether the candidate text string is a complete text string based on the context; and
in response to determining that the candidate text string is the complete text string, providing the complete text string for performing an action.

2. The method of claim 1, wherein the action comprises at least one of summarizing the image and translating the text into another language.

3. The method of claim 1, further comprising:
receiving a number of radius levels and a size for each of the radius levels.

4. The method of claim 1, further comprising:
in response to determining that the candidate text string is not the complete text string,
selecting a next radius level from the plurality of radius levels;
identifying another segmented sub-image around the partial text string within the next radius level;
performing another image search on the another segmented sub-image to identify a new candidate text string; and
in response to determining that the new candidate text string is the complete text string, providing the complete text string for performing the action.

5. The method of claim 1, wherein the image search identifies a new image in a data source of the one or more data sources that includes the context and the partial text string.

6. The method of claim 1, wherein a Software as a Service (SaaS) is configured to perform operations of the method.

7. A computer program product, the computer program product comprising a computer readable storage medium having program code embodied therewith, the program code executable by at least one processor to perform:
utilizing an Optical Character Reader (OCR) to extract a text string from an image;
analyzing context within the image;
determining that the extracted text string is a partial text string based on the context using text coherence; and
for a first radius level of a plurality of radius levels around the partial text string,
identifying a segmented sub-image around the partial text string within the first radius level;
performing an image search on the segmented sub-image to identify a candidate text string by:
searching one or more data sources for an image that includes the partial text string and the context; and
identifying a longer text string that includes the partial text string as the candidate text string;
determining whether the candidate text string is a complete text string based on the context; and
in response to determining that the candidate text string is the complete text string, providing the complete text string for performing an action.

8. The computer program product of claim 7, wherein the action comprises at least one of summarizing the image and translating the text into another language.

9. The computer program product of claim 7, wherein the program code is executable by the at least one processor to perform:
receiving a number of radius levels and a size for each of the radius levels.

10. The computer program product of claim 7, wherein the program code is executable by the at least one processor to perform:
in response to determining that the candidate text string is not the complete text string,
selecting a next radius level from the plurality of radius levels;
identifying another segmented sub-image around the partial text string within the next radius level;
performing another image search on the another segmented sub-image to identify a new candidate text string; and
in response to determining that the new candidate text string is the complete text string, providing the complete text string for performing the action.

11. The computer program product of claim 7, wherein the image search identifies a new image in a data source of the one or more data sources that includes the context and the partial text string.

12. The computer program product of claim 7, wherein a Software as a Service (SaaS) is configured to perform operations of the computer program product.

13. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more memories, to perform operations comprising:
utilizing an Optical Character Reader (OCR) to extract a text string from an image;
analyzing context within the image;
determining that the extracted text string is a partial text string based on the context using text coherence; and
for a first radius level of a plurality of radius levels around the partial text string,
identifying a segmented sub-image around the partial text string within the first radius level;
performing an image search on the segmented sub-image to identify a candidate text string by:
searching one or more data sources for an image that includes the partial text string and the context; and
identifying a longer text string that includes the partial text string as the candidate text string;
determining whether the candidate text string is a complete text string based on the context; and
in response to determining that the candidate text string is the complete text string, providing the complete text string for performing an action.

14. The computer system of claim 13, wherein the action comprises at least one of summarizing the image and translating the text into another language.

15. The computer system of claim 13, wherein the operations further comprise:
receiving a number of radius levels and a size for each of the radius levels.

16. The computer system of claim 13, wherein the operations further comprise:
in response to determining that the candidate text string is not the complete text string, selecting a next radius level from the plurality of radius levels;

identifying another segmented sub-image around the partial text string within the next radius level;

performing another image search on the another segmented sub-image to identify a new candidate text string; and in response to determining that the new candidate text string is the complete text string, providing the complete text string for performing the action.

17. The computer system of claim 13, wherein the image search identifies a new image in a data source of the one or more data sources that includes the context and the partial text string.

18. The computer system of claim 13, wherein a Software as a Service (SaaS) is configured to perform the operations of the computer system.

\* \* \* \* \*